United States Patent [19]

Sato et al.

[11] Patent Number: 4,981,456
[45] Date of Patent: Jan. 1, 1991

[54] REMOTE CONTROLLED HELICOPTER

[75] Inventors: Akira Sato; Makoto Sugimoto; Kyoji Mukumoto, all of Iwata, Japan

[73] Assignee: Yamaha Hatsudoki Kabushiki Kaisha, Iwata, Japan

[21] Appl. No.: 369,005

[22] Filed: Jun. 20, 1989

[30] Foreign Application Priority Data

| Jun. 20, 1988 | [JP] | Japan | 63-152612 |
| Jun. 20, 1988 | [JP] | Japan | 63-152613 |
| Jul. 8, 1988 | [JP] | Japan | 63-171434 |

[51] Int. Cl.$^5$ .................. A63H 27/127; A63H 27/04; A63H 30/04; B64C 11/34
[52] U.S. Cl. .................................. 446/36; 446/30; 446/456; 244/17.13
[58] Field of Search ............. 446/36, 37, 38, 39, 446/40, 41, 42, 43, 44, 45, 34, 30, 31, 32, 33, 454, 456; 244/189, 190, 17.19, 17.13, 12.1, 17.21

[56] References Cited

U.S. PATENT DOCUMENTS

| 2,885,206 | 5/1959 | Ensley | 446/31 X |
| 2,921,743 | 1/1960 | Westover | 446/30 X |
| 3,053,533 | 9/1962 | Weymouth | 446/34 X |
| 3,089,278 | 5/1963 | Brinkley | 446/31 |
| 3,857,194 | 12/1974 | Guttman | 446/36 |
| 4,161,843 | 7/1979 | Hui | 446/37 |
| 4,272,041 | 6/1981 | Mabuchi et al. | 446/37 X |
| 4,406,085 | 9/1983 | Rhodes | 446/456 |
| 4,604,075 | 8/1986 | Richards et al. | 446/454 X |
| 4,729,750 | 3/1988 | Prusman | 446/225 |
| 4,765,567 | 8/1988 | Gutman et al. | 446/36 X |

FOREIGN PATENT DOCUMENTS

| 3008604 | 9/1981 | Fed. Rep. of Germany | 446/456 |
| 2608449 | 6/1988 | France | 446/31 |
| 1287904 | 2/1987 | U.S.S.R. | 446/31 |
| 2091568 | 8/1982 | United Kingdom | 446/31 |

Primary Examiner—Robert A. Hafer
Assistant Examiner—D. Neal Muir
Attorney, Agent, or Firm—Ernest A. Beutler

[57] ABSTRACT

Several embodiments of remote controlled helicopters wherein the longitudinal position of the helicopter is controlled by means of a tether wire affixed to the rear of the helicopter. In some embodiments, the connection of the tether wire to the fuselage is such that at least a portion of the torque created on the fuselage by the rotation of the main rotor is absorbed by the tether wire.

12 Claims, 5 Drawing Sheets

REMOTE CONTROLLED HELICOPTER

BACKGROUND OF THE INVENTION

This invention relates to a remote controlled helicopter and more particularly to an improved arrangement for controlling the flight path of such a helicopter.

Radio controlled aircraft have been popular for recreational purposes for a number of years. Such aircraft include radio controlled helicopters. Recently, however, it has been realized that radio controlled, pilotless helicopters may be used for a wide variety of functional purposes. For example, the use of such radio controlled helicopters for agricultural purposes such as crop spraying has been found to be a very practical purpose. By employing radio controlled helicopters for this use, it is possible to spray relatively large crop areas without having the sprayed chemical travel to areas where spraying is not required. This is possible because the radio controlled helicopter can be operated at a very low altitude close to the ground without danger. However, normal radio controlled helicopters do present certain difficulties in that, when the area to be sprayed is quite large, the accuracy of the control may become a problem.

It is, therefore, a principal object of this invention to provide an improved control arrangement for a radio controlled helicopter.

It is a further object of this invention to provide a control for a radio controlled helicopter wherein at least a portion of the control functions for the helicopter are positively limited.

It has been discovered that the control of a radio control helicopter can be improved if a tether or cable is connected between the fuselage of the helicopter and a fixed point on the ground. By the use of such a tether control, the range of the helicopter can be positively controlled and the radio control function need only apply to the height and lateral position. As a result, improved control is provided without sacrificing the other advantages of radio control. It has been discovered, however, that the point of attachment to the fuselage can be critical in such arrangements.

It is, therefore, a still further object of the invention to provide an improved tether control for a radio controlled helicopter.

As is well known, a helicopter normally includes a main rotor that rotates about a vertically extending axis and is operative to control the height and speed of forward travel of the machine. In addition, there is normally incorporated a tail rotor that operates to provide a counter torque acting against the torque caused by the main rotor which tends to cause the fuselage to rotate about the same axis as the main rotor. It has been found that by appropriately locating the tether control for the helicopter the size of the tail rotor may be reduced or, in fact, the tail rotor may be completely eliminated.

It is, therefore, a still further object of this invention to provide an improved tether control for a radio controlled helicopter that permits reduction in the size or elimination of the tail rotor.

SUMMARY OF THE INVENTION

This invention is adapted to be embodied in a remote controlled helicopter having a fuselage, a rotor journaled for rotation about a generally vertically extending axis and power means carried by the fuselage for driving the rotor. Remote control means are provided for controlling the helicopter from a remote location for varying the height the helicopter flies from the ground and the lateral position of the helicopter from a fixed point on the ground. Tether wire means are connected to the fuselage at a point rearwardly from the rotor axis and to the ground at a fixed point for controlling the longitudinal distance of the helicopter from the fixed point.

In accordance with another feature of the invention, the rearward connection of the tether to the helicopter is effective to reduce or eliminate the need for a tail rotor.

DETAILED DESCRIPTION OF THE PREFERRED EMBODIMENTS

Figure 1:
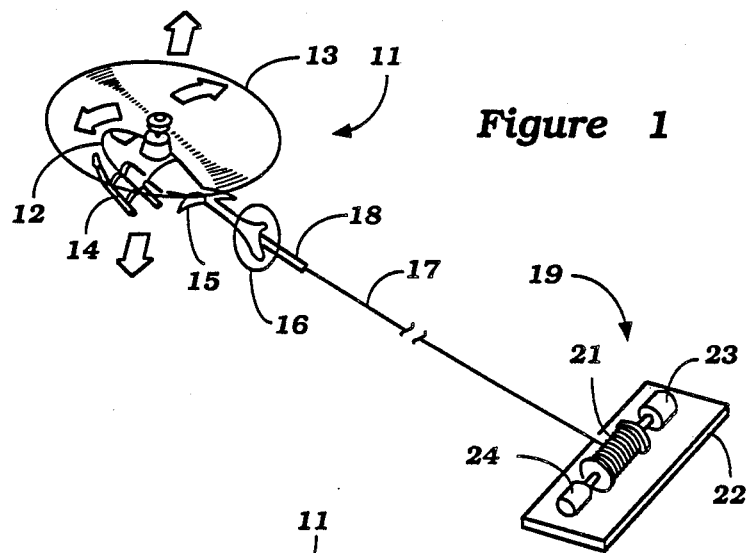
FIG. 1 is a perspective view of a remote controlled helicopter constructed in accordance with a first embodiment of the invention.
Figure 2:
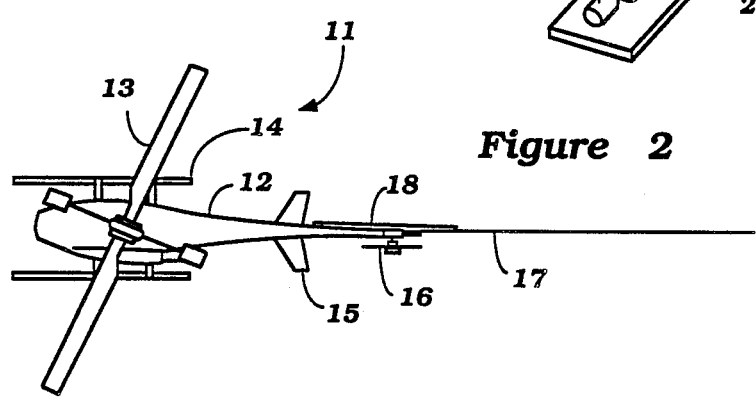
FIG. 2 is a top plan view of the helicopter and a portion of the tether control.
Figure 3:
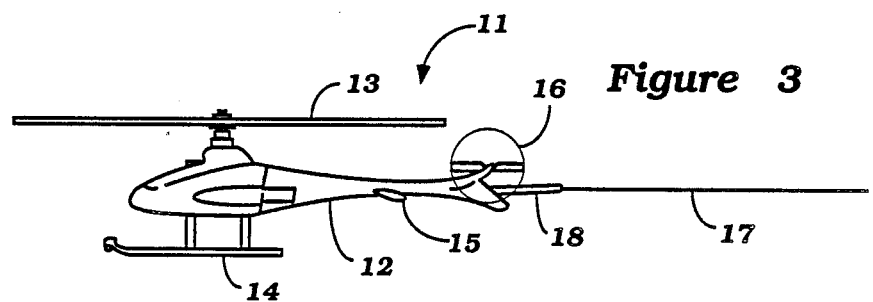
FIG. 3 is a side elevational view thereof.

Referring first to FIGS. 1 through 3, a remote controlled helicopter constructed in accordance with a first embodiment of the invention is identified generally by the reference numeral 11. The helicopter 11 includes a fuselage assembly 12 that contains an internal combustion engine for driving a main rotor 13 for rotation about a generally vertically extending axis that passes generally centrally through the main portion of the fuselage 12. A pair of ground engaging skids 14 are carried by the fuselage 12 for ground support. The fuselage 12 further includes a pair of tail fins 15 and a driven tail rotor 16 that is designed so as to create a torque that counters the rotational torque reaction caused by the rotation of the main rotor 13 on the fuselage 12. The tail rotor 16 is driven from the same engine that drives the main rotor 13 in a known manner.

Figure 4:
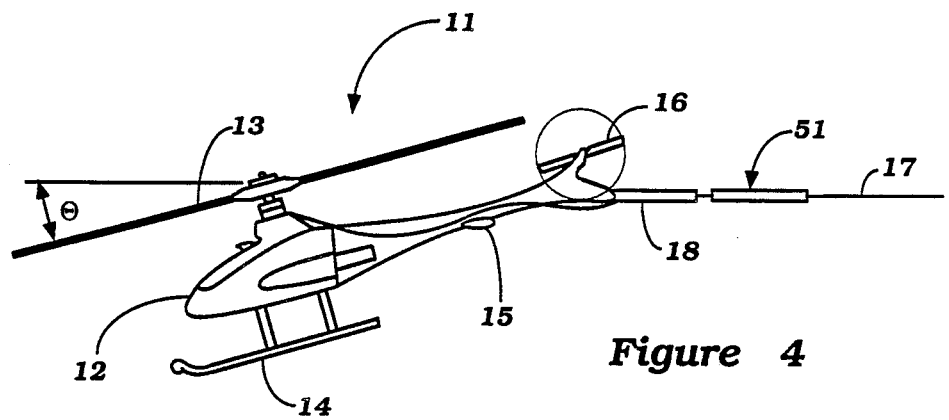
FIG. 4 is a side elevational view, showing another embodiment of the invention with an arrangement for maintaining a predetermined tension on the tether control.
Figure 5:
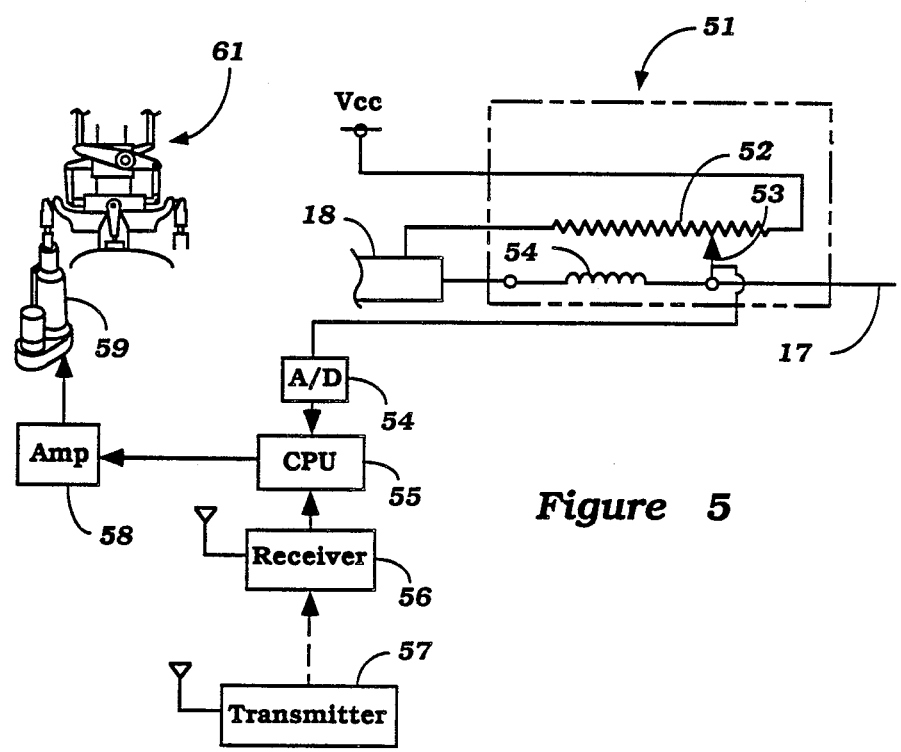
FIG. 5 is a schematic view showing how the embodiment of FIG. 4 operates.

In accordance with the invention, there is provided a remotely positioned remote controller (not shown) of a type which may be schematically seen in the embodiment of FIGS. 4 and 5, and which operates a receiver (not shown) carried by the fuselage 12 for operating servo motors to control the vertical height at which the helicopter 11 flies and also its lateral position with respect to a fixed point on the ground. The longitudinal position is controlled, however, by means of a tether wire 17 that is connected at one end to a bar 18 which is, in turn, affixed to the rear end of the fuselage 12. The bar 18 has sufficient length so as to clear the tail rotor 16 so that the tether wire 17 will not be cut by the tail rotor 16. The bar 18 is affixed to the opposite side of the fuselage from the tail rotor 16.

The opposite end of the tether wire 17 is connected to a fixed point on the ground by means of a tether control, indicated generally by the reference numeral 19. The tether control 19 includes a drum 21 around which the tether wire 17 is wound and which is carried by a base plate 22 that is located at a desired fixed point on the ground. The drum 21 is rotated by a servo motor 23 that can be remotely controlled by the same remote controlled operator that controls the functions on the helicopter 11. An encoder 24 is also coupled to the drum 21 so as to provide a control signal indicative of the position of the drum 21 and, accordingly, the length of the wire 17 which has been played out and thus the longitudinal position of the helicopter 11 relative to the fixed point on the ground.

In the embodiment as described, the control for the helicopter 11 was of the so called wireless radio controlled type. It is to be understood, however, that the invention can be also utilized in connection with a remote controlled arrangement wherein the signals are transmitted over the tether cable 17.

In the embodiment as thus far described, the tension on the tether wire 17 has been controlled manually by rotation of the drum 21 under operator control. However, it is also possible to employ an arrangement for automatically maintaining a predetermined tension in the tether wire 17 and FIGS. 4 and 5 illustrate one such embodiment. Referring specifically to these figures, a tensioner control, indicated generally by the reference numeral 51 is incorporated in the tether wire 17 at an appropriate position along its length, for example, adjacent where the tether wire 17 is connected to the bar 18. The tensioner control 51, in the illustrated embodiment, is of the variable potentiometer type and includes a fixed resistor 52 that is supplied with a source of voltage Vcc. This resistor 52 is contacted by means of a movable wiper 53 that is connected to the tether wire 17 and which is biased by means of a coil compression spring 54 that is fixed to a base of the tensioner control 51 and to the bar 18 in an appropriate manner. As may be seen, the varying tension of the tether wire 17 will cause the wiper 53 to move along the resistor 52 and give a signal to an analog to digital converter 54. The analog to digital converter 54 outputs a digital signal to a central processing unit (CPU) or computer 55 which, in turn, then determines the desired tension. The CPU 55 also receives a signal from the receiver 56 that is controlled by the remote transmitter 57 and outputs a signal to an amplifier 58 which controls a servo mechanism 59 so as to change the pitch of the main rotor 13 through the angle 0 by means of its pitch controlling mechanism 61 so as to cause sufficient forward thrust to maintain the desired tension on the tether cable 17.

Figure 6:
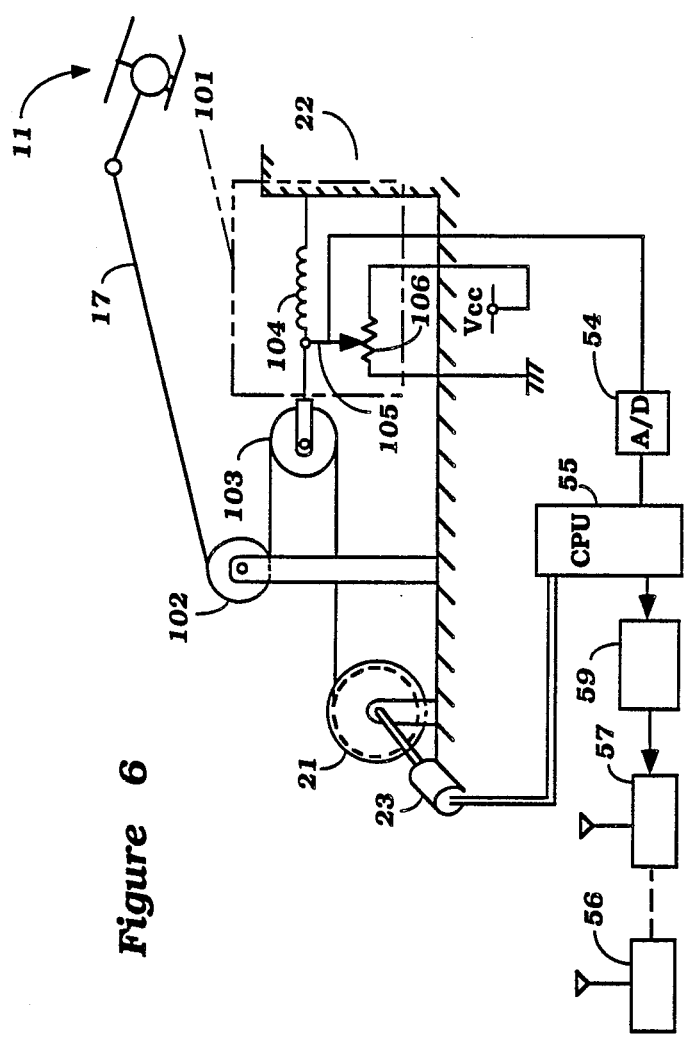
FIG. 6 is a partially schematic side elevational view of another embodiment of the invention including a different type of tether tension control.

FIG. 6 shows another embodiment of the invention wherein the tether wire 17 is associated with a tensioner control 101 that is supported on the base 22 of the drum control 19. In this embodiment, the tether wire 17 is trained over a fixed pulley 102 and a movable pulley 103 before reaching the drum 21. The movable pulley 103 is retained by means of a tensioner spring 104 and carries a movable wiper 105 that contacts a variable resistor 106 that is in circuit with a constant voltage source Vcc.

There is outputted thus a signal from the variable resistor 106 to the analog to digital converter 54 that is indicative of the tension in the pulley. This analog signal is converted to a digital signal by the analog to digital converter 54 and is processed by the CPU 55 so as to control the elevator 59 of the helicopter 11 to provide the desired tension control.

Figure 7:
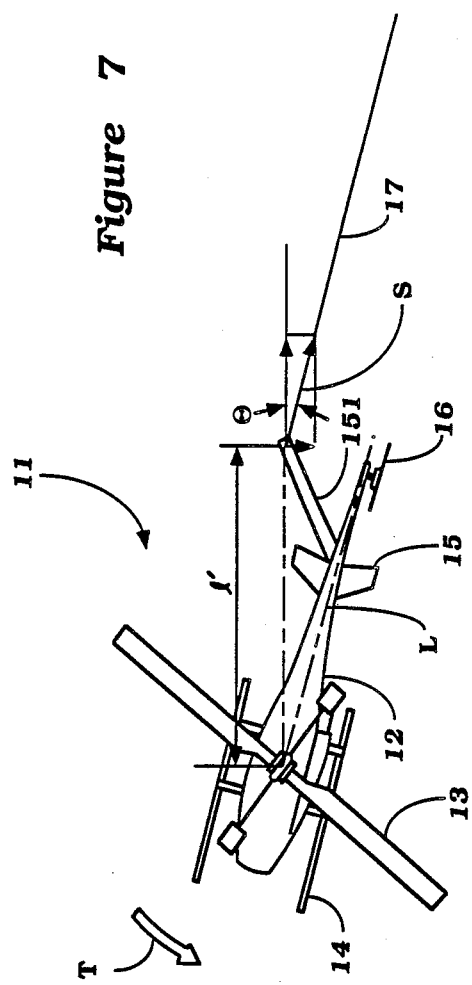
FIG. 7 is a top plan view, in part similar to FIG. 2, showing how the tether arrangement can be employed to reduce the size of the tail rotor.

It should be noted that the control wire 17 is affixed to the rear portion of the fuselage 12. As this attachment offers better control and, furthermore, can be utilized so as to provide a torque that will counteract against the torque caused by the main rotor 13 so as to either reduce the size of the tail rotor 16 necessary to countervail this torque or completely eliminate it. FIG. 7 shows one embodiment wherein this result may be achieved.

Figure 8:
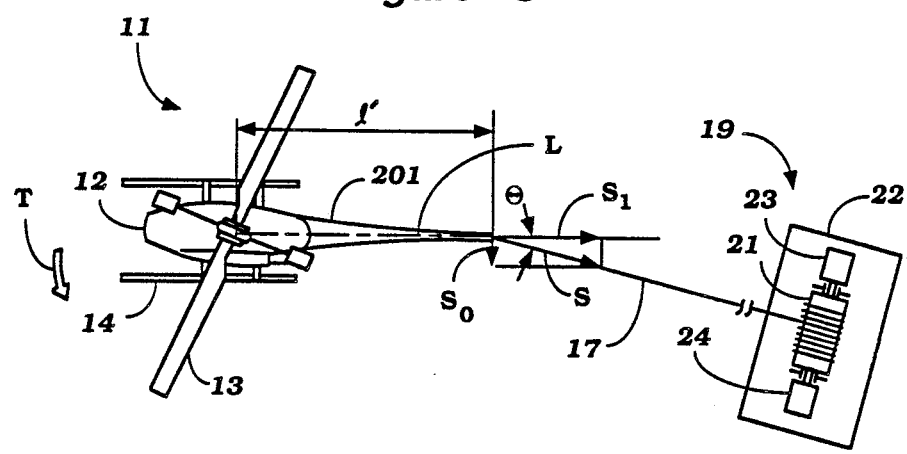
FIG. 8 is a top plan view, in part similar to FIGS. 2 and 7, showing another embodiment of the invention wherein the fuselage configuration can be changed and the tail rotor completely eliminated.

As may be seen in this embodiment, a bar 151 to which the tether wire 17 is affixed is disposed at an angle to the longitudinal line L of the main fuselage 12. As a result, the tether 17 makes an angle $\theta$ with a line intersecting the axis of rotation of the main rotor 13 and which is offset by the distance 1'. As a result, the tension in the cable S will create a countervailing torque opposing the torque T created by the main rotor on the fuselage 12 and thus this torque can reduce the torque necessary to be generated by the tail rotor 16 to maintain stability. In fact, if the tension is sufficient, then the tail rotor can be completely eliminated as shown in the embodiment of FIG. 8. Because of this elimination, the fuselage 12 may be truncated and only a tail bar 201 need be provided to which the tether cable 17 is affixed. As may be seen, the angular relationship $\theta$ gives a countervailing torque acting through the distance 1 which torque is created by the transverse force So.

Figure 9:
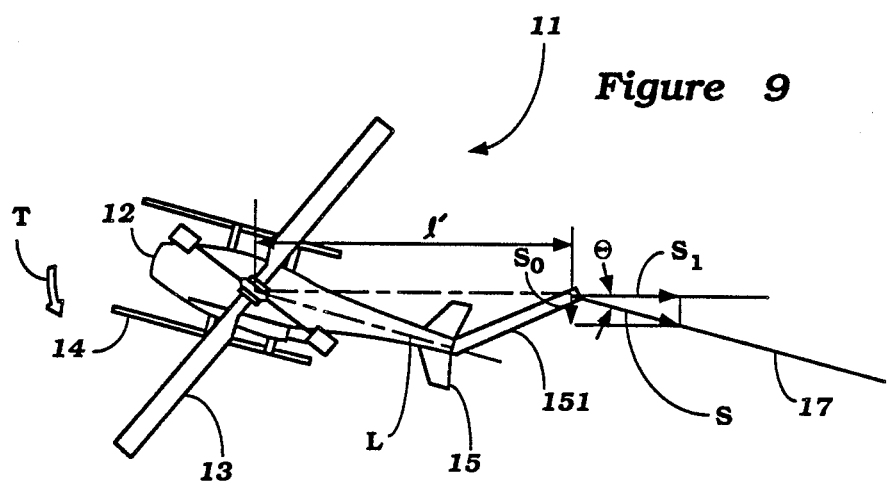
FIG. 9 is a top plan view, in part similar to FIGS. 2, and 7 and 8, and shows another embodiment of the invention.

In the embodiment of FIG. 8, the bar 201 extends longitudinally of the fuselage and hence the tether wire 17 must be disposed at the angle $\theta$ to the main fuselage in order to provide the countervailing torque. In order to obtain a more natural flying condition, the offset arm 151, as in the embodiment of FIG. 7, may be employed. If sufficient offset is utilized as is shown in FIG. 9, then the tail rotor can be completely dispensed with.

It should be readily apparent from the foregoing descriptions that a number of embodiments of the invention have been illustrated and described, each of which provides a very effective and simple control for a remote controlled helicopter. In some embodiments, the construction is such that the size of the tail rotor may be reduced or, in fact, eliminated. Although a number of embodiments of the invention have been illustrated and described, variations and modifications may be made without departing from the spirit and scope of the invention, as defined by the appended claims.

We claim:

1. A remote controlled helicopter having a fuselage, a rotor journaled for rotation about a generally vertically extending axis by said fuselage, power means carried by said fuselage for driving said rotor, said rotor and said power means being operable for varying the direction said helicopter travels and its height above the ground, remote control means for operating said helicopter from a remote location for varying the height said helicopter flies above the ground and the lateral position of said helicopter from a fixed point on the ground, and flexible tether wire means connected to said fuselage at a point rearwardly from said rotor axis and to said ground at said fixed point for limiting the distance, and thereby height also, of said helicopter from the fixed point on the ground without restraining the direction of travel or lateral position within a selected length of said tether wire.

2. A remote controlled helicopter as set forth in claim 1 wherein the remote control is provided by a wireless radio control.

3. A remote controlled helicopter as set forth in claim 1 further including means for changing the length of the tether wire for changing the distance of the helicopter from the fixed point.

4. A remote controlled helicopter as set forth in claim 1 further including tension sensing means for sensing the tension in the tether wire.

5. A remote controlled helicopter as set forth in claim 4 further including servo means controlled by the tension for maintaining a uniform tension in the tether wire.

6. A remote controlled helicopter as set forth in claim 5 wherein the tension sensing means is provided in the tether wire.

7. A remote controlled helicopter as set forth in claim 6 wherein the tension sensing means is connected to the tether wire contiguous to the point where the tether wire is connected to the fuselage.

8. A remote controlled helicopter as set forth in claim 5 wherein the tension sensing means is positioned at the point where the tether wire is connected to the ground.

9. A remote controlled helicopter as set forth in claim 1 wherein the tether wire is offset at an angle to the longitudinal line of the fuselage for absorbing at least in part torque generated on the fuselage by the rotor.

10. A remote controlled helicopter as set forth in claim 9 wherein the tether wire absorbs all of the torque on the fuselage created by the rotor.

11. A remote controlled helicopter as set forth in claim 9 further including a tail rotor for absorbing a portion of the torque created on the fuselage.

12. A remote controlled helicopter as set forth in claim 9 wherein the fuselage is truncated and the tether wire is connected to a bar extending rearwardly from the rear of the fuselage.

* * * * *